(12) United States Patent
Rank et al.

(10) Patent No.: US 10,198,493 B2
(45) Date of Patent: Feb. 5, 2019

(54) ROUTING REPLICATED DATA BASED ON THE CONTENT OF THE DATA

(71) Applicants: Christopher Hugh Rank, Boulder, CO (US); Victoria Anne Stuart, Oakland, CA (US)

(72) Inventors: Christopher Hugh Rank, Boulder, CO (US); Victoria Anne Stuart, Oakland, CA (US)

(73) Assignee: SYBASE, INC., Dublin, CA (US)

( * ) Notice: Subject to any disclaimer, the term of this patent is extended or adjusted under 35 U.S.C. 154(b) by 332 days.

(21) Appl. No.: 14/145,465

(22) Filed: Dec. 31, 2013

(65) Prior Publication Data
US 2015/0186486 A1 Jul. 2, 2015

Related U.S. Application Data

(60) Provisional application No. 61/892,882, filed on Oct. 18, 2013.

(51) Int. Cl.
G06F 17/30 (2006.01)
(52) U.S. Cl.
CPC .............................. G06F 17/30575 (2013.01)
(58) Field of Classification Search
CPC .......... G06F 17/30575; G06F 11/1662; G06F 11/2074; G06F 17/30091
See application file for complete search history.

(56) References Cited

U.S. PATENT DOCUMENTS

| | | | |
|---|---|---|---|
| 7,801,851 B2 | 9/2010 | Holenstein et al. | |
| 8,024,294 B2 | 9/2011 | Kottomtharayil | |
| 8,086,566 B2 | 12/2011 | Edlund et al. | |
| 8,121,978 B2 | 2/2012 | Wiss et al. | |
| 8,412,674 B2 | 4/2013 | Zhu et al. | |
| 8,510,270 B2 | 8/2013 | Pareek et al. | |
| 8,626,709 B2 | 1/2014 | Isaacson et al. | |
| 8,868,506 B1 | 10/2014 | Bhargava et al. | |
| 9,652,485 B1 | 5/2017 | Bhargava et al. | |
| 2003/0208511 A1 | 11/2003 | Earl et al. | |
| 2004/0117478 A1 | 6/2004 | Triulzi et al. | |
| 2006/0047713 A1 | 3/2006 | Gornshtein et al. | |
| 2007/0101256 A1* | 5/2007 | Simonyi | G06F 17/2288 715/203 |
| 2007/0185852 A1* | 8/2007 | Erofeev | G06F 17/30212 707/999.004 |
| 2007/0185939 A1* | 8/2007 | Prahland | G06F 17/30212 707/999.204 |

(Continued)

OTHER PUBLICATIONS

Sybase, "New Features Bulletin, Replication Agent 15.6," Nov. 2010, Sybase, Inc., 14 pages.

(Continued)

*Primary Examiner* — Yuk Ting Choi
(74) *Attorney, Agent, or Firm* — Sterne, Kessler, Goldstein & Fox P.L.L.C.

(57) ABSTRACT

Disclosed herein are system, method, and computer program product embodiments for routing data to be replicated based on the content of the data. An embodiment operates by retrieving a row from a database transaction log receiving a filtering condition. The embodiment evaluates whether the content of the row satisfies the filtering condition and selects a replication path for transmitting the transaction for replication.

22 Claims, 10 Drawing Sheets

(56) References Cited

U.S. PATENT DOCUMENTS

| | | | |
|---|---|---|---|
| 2007/0255763 | A1 | 11/2007 | Beyerle et al. |
| 2008/0114816 | A1 | 5/2008 | Shepherd |
| 2009/0313311 | A1 | 12/2009 | Hoffmann et al. |
| 2010/0030730 | A1 | 2/2010 | Shang et al. |
| 2010/0030824 | A1 | 2/2010 | Slung et al. |
| 2011/0295804 | A1* | 12/2011 | Erofeev ............. G06F 11/1435 707/634 |
| 2013/0054526 | A1 | 2/2013 | Vincenzo |
| 2013/0067017 | A1* | 3/2013 | Carriere ................ G06Q 10/06 709/208 |
| 2013/0124464 | A1* | 5/2013 | Rank ................ G06F 17/30575 707/610 |
| 2013/0159249 | A1 | 6/2013 | Dewall et al. |

OTHER PUBLICATIONS

Sybase, "New Features Guide, Replication Server 15.7.1," Apr. 2012, Sybase, Inc., 202 pages.

Bishal A Caregaonkar, "WebSphere Application Server Top 10 Performance Tuning Recommendations," IBM Corporation, Dec. 15, 2011, available at https://www.ibm.com/developerworks/community/wikis/form/anonymous/api/wiki/e8958ad9-597f-4a29-8614-f3a75cee99c9/page/f09cd3cf-9515-4de6-92c7-38f11d406cf0/attachment/e6ee8e9a-3faa-4e54-b11c-90429fc0e481/media. 28 pages.

* cited by examiner

ROUTING REPLICATED DATA BASED ON THE CONTENT OF THE DATA

CROSS-REFERENCE TO RELATED APPLICATIONS

This application claims the benefit of U.S. Provisional Application No. 61/892,882, filed Oct. 18, 2013 and entitled "Routing Replicated Data Based on the Content of the Data," which is incorporated herein by reference in its entirety.

BACKGROUND

Commercial database systems commonly replicate their data across multiple replication servers in order to improve reliability, fault-tolerance and accessibility. Replicating data typically involves communicating the information in a primary database to one or more replicate databases while maintaining consistency between the databases. Traditionally replicating data involves using a replication agent.

A replication agent can be configured to replicate data based on rules and policies. For example, a replication agent can be configured by specifying one of several paths through which certain data should be replicated. Replication agents typically look at an object identifier associated with a data transaction when determining which path to replicate data through. However, looking at an object identifier may not yield the most efficient or desirable way of determining data replication paths.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for routing data to be replicated based on the content of the data.

Figure 1:
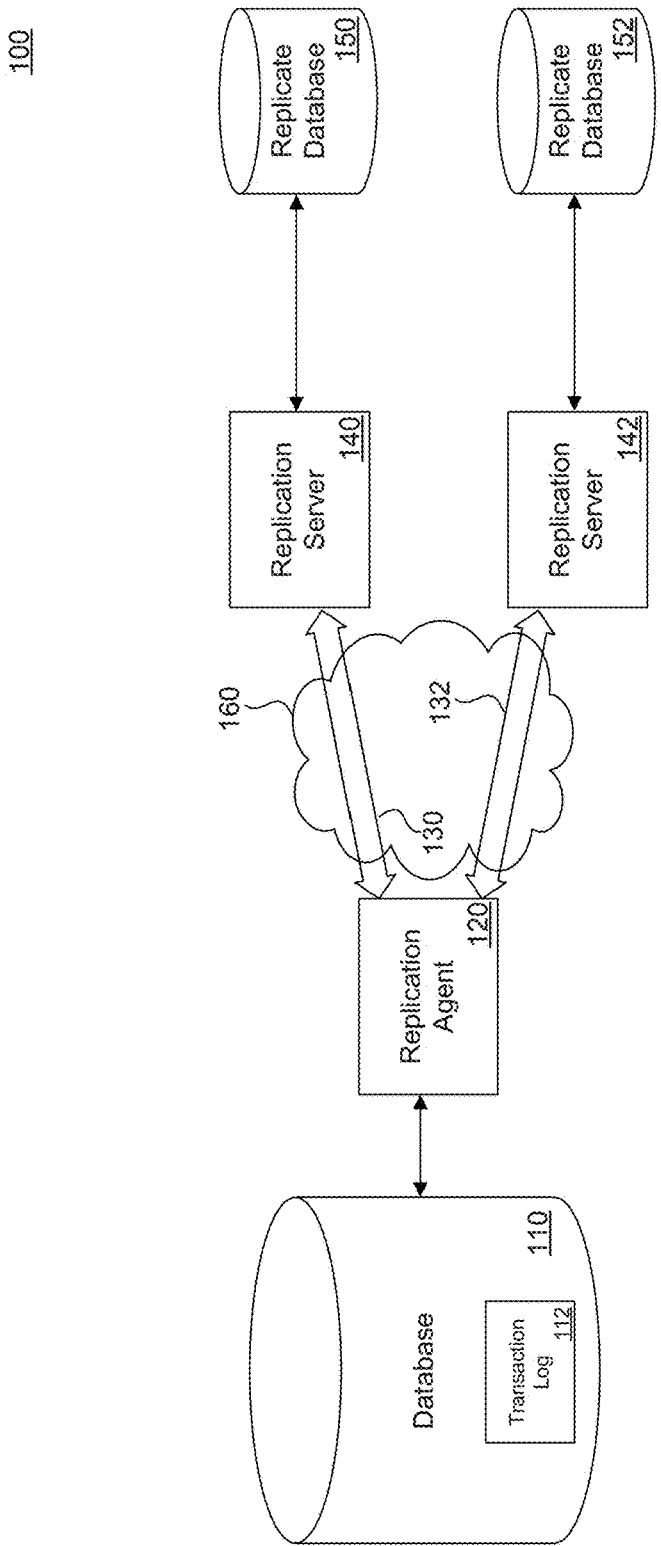
FIG. 1 is block diagram of a data replication environment, according to an example embodiment.

FIG. 1 is block diagram of a data replication environment 100, according to an example embodiment. Data replication environment 100 includes a database 110, a replication agent 120, replication paths 130 and 132, replication servers 140 and 142, replication databases 150 and 152, and network 160. Data replication environment 100 can include one or more computing devices, such as those described with reference to FIG. 9 below, to host the replication agent 120 and replication servers 140 and 142.

Database 110 can be any processing system configured to organize and store data, as will be understood by those skilled in the relevant arts. Database 110 can include storage configured to store data by a database management system (DBMS). Database 110 receives transactions that can, for example, insert, delete or update data in storage. Database 110 can maintain a record of transactions in a transaction log. In general, new transactions can be recorded in a transaction log and later committed to storage. If a crash or hardware failure occurs, database 110 can use the transaction log to return the database 110 to a consistent state.

Replication agent 120 can provide replication of transactions in a transaction log. In an embodiment, replication agent 120 exists separately from and communicates with database 110. In an embodiment, replication agent 120 forms part of database 110. In the depicted embodiment, replication agent 120 can communicate transactions to replication servers 140 and 142, which can replicate the transaction in replication databases 150 and 152, respectively.

In an embodiment, replication agent 120 reads transaction data from transaction log 112 and converts the transaction data into a transmissible format. The replication agent 120 can transmit transactions for replication through one or more replication paths, such as replication paths 130 and 132. Replication paths can be physical communication paths between replication agent 120 and one or more replication servers (e.g., replication servers 140,142). In an embodiment, replication paths can traverse network 160, and can comprise, for example, virtual paths through the network.

Network 160 can be any data network as understood by those skilled in the relevant arts. For example, network 160 can be a local area network (LAN), a wide area network (WAN), the Internet, etc. Moreover, in embodiments, additional networks can form part of environment 100. For example, devices in environment 100 may communicate over one or more networks.

Replication may be desirable, for example, in order preserve data in the event of a failure or in order to distribute access loads. In an embodiment, replication agent 120 provides log based replication that distributes transactions to remote sites, such as replication servers 140 and 142.

In an embodiment, replication agent 120 decides which path or paths to send data for replication based on a replication filter. A replication filter can contain user-configurable criteria that allow users of the database and replication agent to specify the path through which individual log records can be sent for replication. In an embodiment, the replication filter can be stored as a database object in database 110. The replication filter can be used to encapsulate a set of user-defined conditions (e.g., filter conditions) to determine if a data row satisfies filtering criteria for replication path routing.

Figure 2:
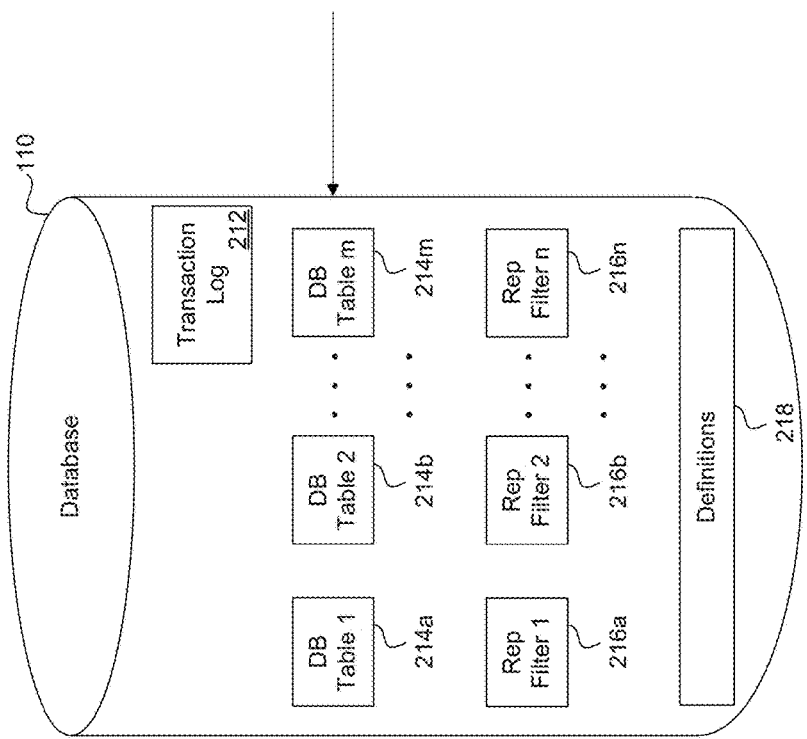
FIG. 2 is block diagram including details of a data replication system, according to an example embodiment.

FIG. 2 depicts a system diagram including details of a data replication system, according to an example embodiment.

In an embodiment, database 110 includes a transaction log 212, database tables 214a-m and replication filters 216a-n.

Transaction log 212 can maintain a record of database transactions such as, for example, insert, delete and update operations.

Database tables 214a-m can be database tables containing data stored in a user-defined organization of rows of columns, as will be understood by those skilled in the relevant arts.

Replication filters 216a-n can contain filtering criteria that the replication agent can use to determine how data rows should be routed for replication. In an embodiment, a replication filter is associated with a particular database table and a particular path. In an embodiment, multiple replication filters can be associated with the same database table. Conflicts arising out of multiple replication filters providing conflicting criteria are addressed below with reference to FIGS. 6 and 7.

Database definitions 218 can contain data structures that define database tables and replication filters and information linking them. The database definitions 218 can also contain linkages between replication filters and replication paths. Further details of database definition structures are explained below with reference to FIG. 3.

In an embodiment, a replication filter can consist of three parts: a Filter Name, a Table Name, and a Filter Condition. The Filter Name can be a name that a user will use to refer to this object. In an embodiment, the filter name is unique in the database. The Table Name is a table that is associated with the filter, and whose data will be tested against the filter conditions in order to determine the path through which the data will be replicated. The Filter Condition can be a set of conditions for which the log row data for that table will be tested against. In an embodiment, the Filter Condition is a "where clause" query that returns a Boolean result.

In an embodiment, the replication agent creates replication filters based on user input. In an embodiment, a user or replication agent can create a replication filter by using a database query such as, for example:

create replication filter <filter name> on <table name> as <filter condition>

Filter conditions can be of arbitrary complexity and may contain conditions applying to any number of columns from the underlying table. For example, the conditions may contain:

Comparison operators (>, <, =, !=, etc.)
Ranges ("between" and "not between")
Lists ("in" and "not in")
Character comparisons ("like" and "not like")
Built-in functions returning determinate results
Logically connected conditions ("AND" and "OR")

For example, a filtering condition could specify that the transactions where the age of a person is greater than 64 years old should be replicated through a particular path. Such a replication filter could be created with a database query such as:

create replication filter "Senior Citizens" on "Employees" as (Age>64)

The transactions for employees in the Employees table greater than age 64 would then be replicated through the path associated with the filter. The associations can be stored in the database definitions 218.

In one embodiment, once a replication filter is created, the database converts the replication condition into a stored procedure executable by a query processor, for example, a query processor integrated into the database system. Having the replication condition as a stored procedure can allow a query processor to evaluate the transaction row data efficiently. For example, making the replication filter a procedure can permit a query processor to process deterministic built-in expressions, arithmetic operations, in lists, as well as most other expressions allowed in a query where clause. The stored procedure design can also allow compiling plans once and then reutilizing the plan on subsequent executions with little overhead.

Figure 3:
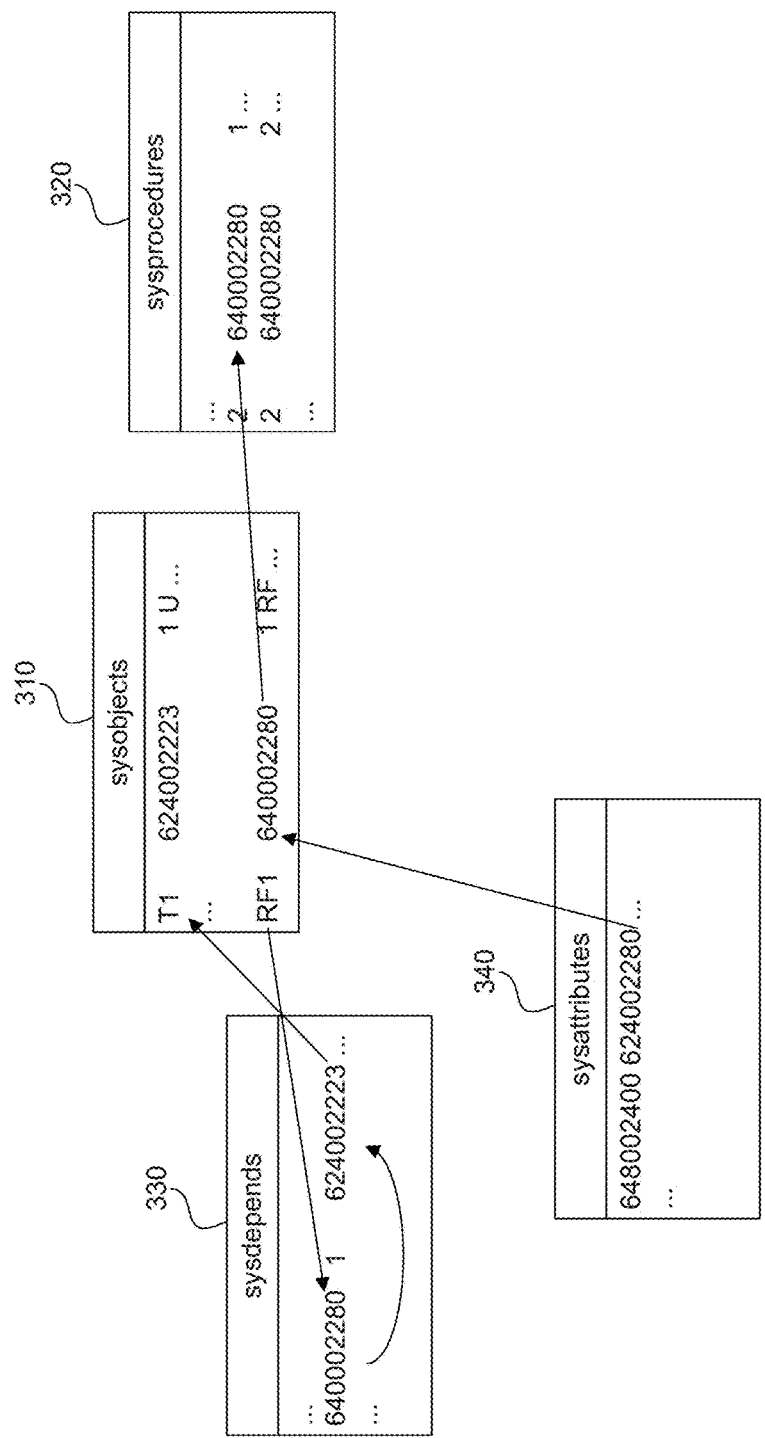
FIG. 3 depicts a set of database definition tables that link database tables with replication filters and their associated stored procedures, according to an example embodiment.

FIG. 3 depicts a set of database definition tables that link database tables with replication filters and their associated stored procedures, according to an example embodiment. The database definitions 218 in database 110 can include the database definition tables.

In an embodiment, the database includes a table for objects (e.g., sysobjects table 310), a table for procedures (e.g., sysprocedures table 320), a table for dependencies (e.g., sysdepends table 330). and a table for attributes (e.g., sysattributes table 340).

Sysobjects table 310 can contain a list of objects stored in the database (e.g., database 110 in FIG. 1). The list can include a name for the object and an object identifier (ID). For example, sysobjects table 310 as depicted contains a table with table name T1 and object ID 624002223. In an embodiment, replication filters are also database objects and therefore also contain entries in sysobjects table 310. In the example shown, the database contains a replication filter named RF1 with object ID 640002280.

Sysprocedures table 320 can contain a list of procedures stored in the database. As explained above, once a replication filter is created, the database converts the replication condition into a stored procedure, according to one embodiment. As shown in FIG. 3, the sysprocedures table 320 in this scenario contains a procedure entry for the replication filter RF1, with object ID 640002280.

Sysdepends table 330 can contain a list of dependencies linking, for example, a replication filter with a table. In the example depicted, replication filter RF1 is associated with table T1, and thus an entry reflecting this association is created in sysdepends table 330. The replication agent can then access the sysdepends table 330 in order to find replication filters associated with a table's transactions.

Sysattributes table 340 can contain a list of dependencies between replication paths and replication filters. In an embodiment, a replication filter can be associated with a replication path by creating a binding. In an embodiment, a replication filter can be associated with multiple paths. These bindings between a replication filters and a paths can be stored in the sysattributes table 340. When the replication agent determines a row meets a replication filter's condition, the agent can examine the sysattributes table 340 to determine which paths to replicate the transaction through.

Figure 4:
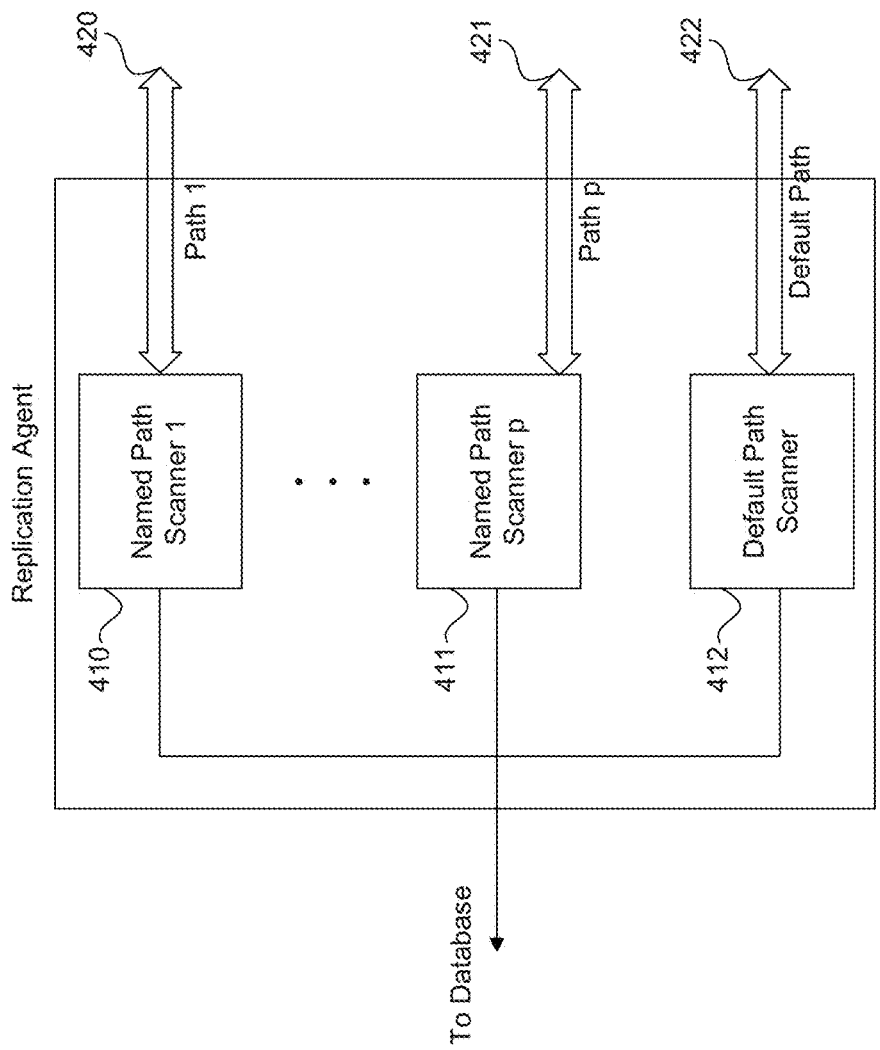
FIG. 4 is a block diagram including details of a replication agent, according to an example embodiment.

FIG. 4 depicts a system diagram including details of a replication agent, according to an example embodiment.

The replication agent (e.g., replication agent 120 in FIG. 1) can begin replicating data once the replication filters and path bindings have been created. In an embodiment, the replication agent includes named path scanners 410,411, default path scanner 412, named paths 420,421 and default paths 422. In an embodiment, individual paths have a dedicated scanner.

In an embodiment, a default path 422 is used as the primary route/connection between the replication agent and a replication server (e.g., replication server 140 or replication server 142 in FIG. 1). In an embodiment, the default path 422 exists and cannot be referred to by name from the path stored procedures for the purposes of configuring or binding objects to the path. The default path 422 can be a path by which rows not otherwise bound to a specified path/filter should be delivered.

In an embodiment, a named path 420,421 is an additional, alternative route between the replication agent and a replication server. In an embodiment, a named path 420,421 carries data explicitly bound to the path by a replication filter.

Named path scanners 410 and 411 can evaluate whether data should be sent through their associated named path 420 and 421, respectively. In an embodiment, a particular path scanner is associated with a particular named path. Default path scanner 412 can evaluate whether data is not associated with any other path, and thus should be sent through the default path 422.

When a filter is bound to a named path an explicit linkage can be made between the filter and the named path. Because a log can contain data rows that do not satisfy any filter conditions, in an embodiment, each filter would also have an implicit linkage with the default path so that non-satisfying rows are replicated via the default path 422.

Figure 5:
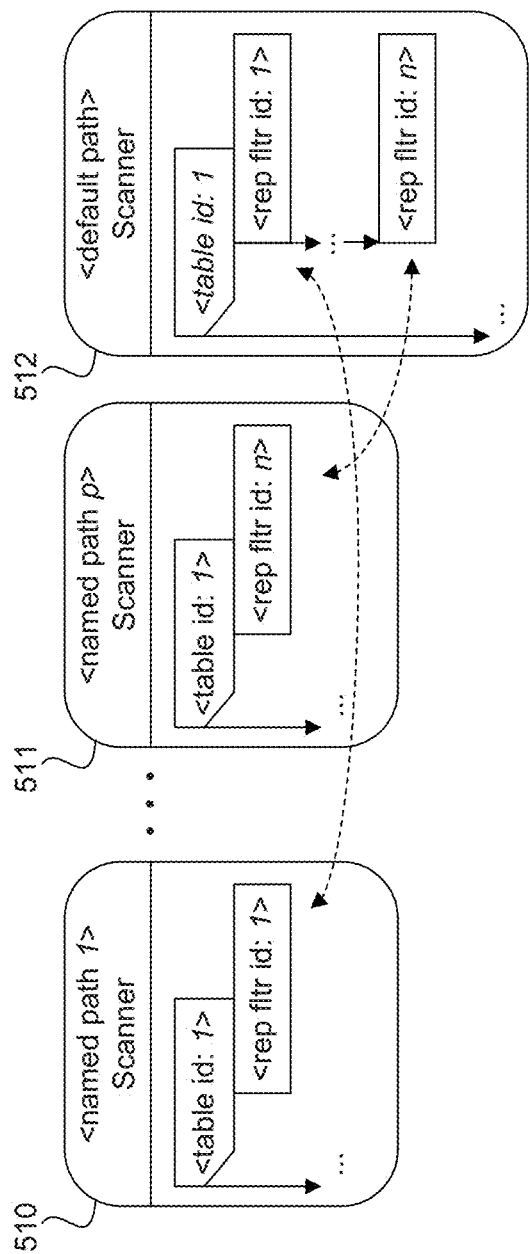
FIG. 5 is a block diagram describing the activities of a replication agent path scanner, according to an example embodiment.

FIG. 5 depicts a block diagram describing the activities of a replication agent path scanner, according to an example embodiment.

Named path scanners 510 and 511 can be associated with named paths. For example, named path scanner 510 may be associated with path 1 and named path scanner 511 may be associated with path p. In an embodiment, when the named path scanner 510 starts, the named path scanner 510 for path 1 retrieves the set of replication filter object identifiers associated with path 1 from the table for attributes (e.g., sysattributes table 340 in FIG. 3) described above, and further retrieves the set of tables associated using the dependencies table (e.g., sysdepends table 330) described above. For each table the named path scanner 510 can create and store a list of replication filters (e.g., <ref fltr id: 1>, etc.) indexed on the table object identifier (e.g., <table id: 1>, etc.).

Default path scanner 512 manages the replicating of rows that do not satisfy filter conditions. The default path scanner 512 can evaluate the filter conditions against one or more rows. The default path scanner 512 can create a list of replication filters indexed on their associated replication filters.

As shown by the arrows in FIG. 5, multiple scanners can contain references to the same replication filters. In an embodiment, the default path will contain references to all replication filters.

During a loading phase, the scanners can load information about the tables and replication filters. When the information is loaded, the scanners can begin processing and replicating the transaction log of the database. In an embodiment, each transaction log data row for a table contains the object ID of the table.

Figure 6:
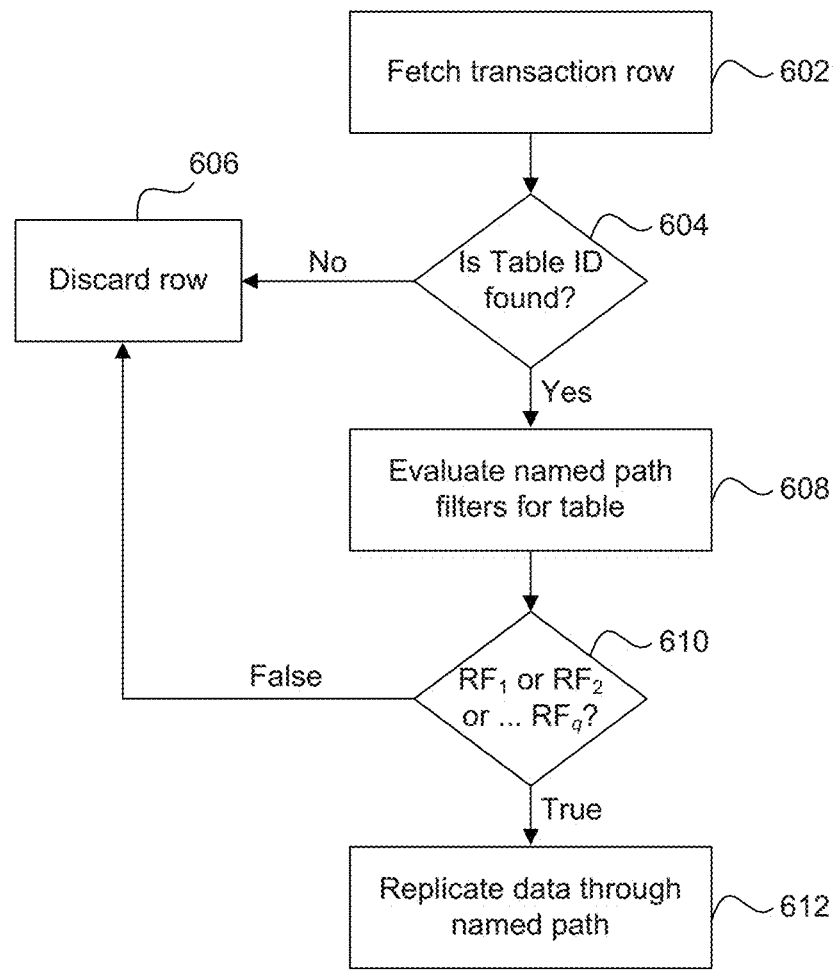
FIG. 6 is a flowchart describing a method for a named path scanner to evaluate and replicate data through a named path, according to an embodiment.

FIG. 6 is a flowchart 600 describing a method for a named path scanner to evaluate and replicate data through a named path, according to an embodiment. In some embodiments, not all of the described operations are performed. In some embodiments, operations may be performed in a different order than described.

At operation 602, the named path scanner fetches a row from the transaction log.

At operation 604, the named path scanner compares the table ID of the row to the list of table IDs serviced by the named path, which was generated during the loading phase. The scanner determines whether the table ID is in the list. The table ID not being found in the list can be an indication that there is no replication filter associated with this table for this named path, and the method discards the row, in operation 606. If the table ID is found in the list, the named path scanner proceeds to operation 608.

At operation 608, when the table ID is found in the list, the named path scanner evaluates the replication filter conditions associated with the table to determine if the row should be replicated through the named path. If any of the replication conditions is met, the row is replicated through the associated named path. In one embodiment, the determination is made using an OR function of the replication filters associated with this table and named path, as shown in operation 610.

If at operation 610 one of the replication filter conditions is satisfied, the named path scanner replicates the data through a named path at operation 612. For example, when a replication filter condition is met, the name path scanner transmits the data of the row using the named path. Otherwise, the named path scanner discards the row at operation 606.

Figure 7:
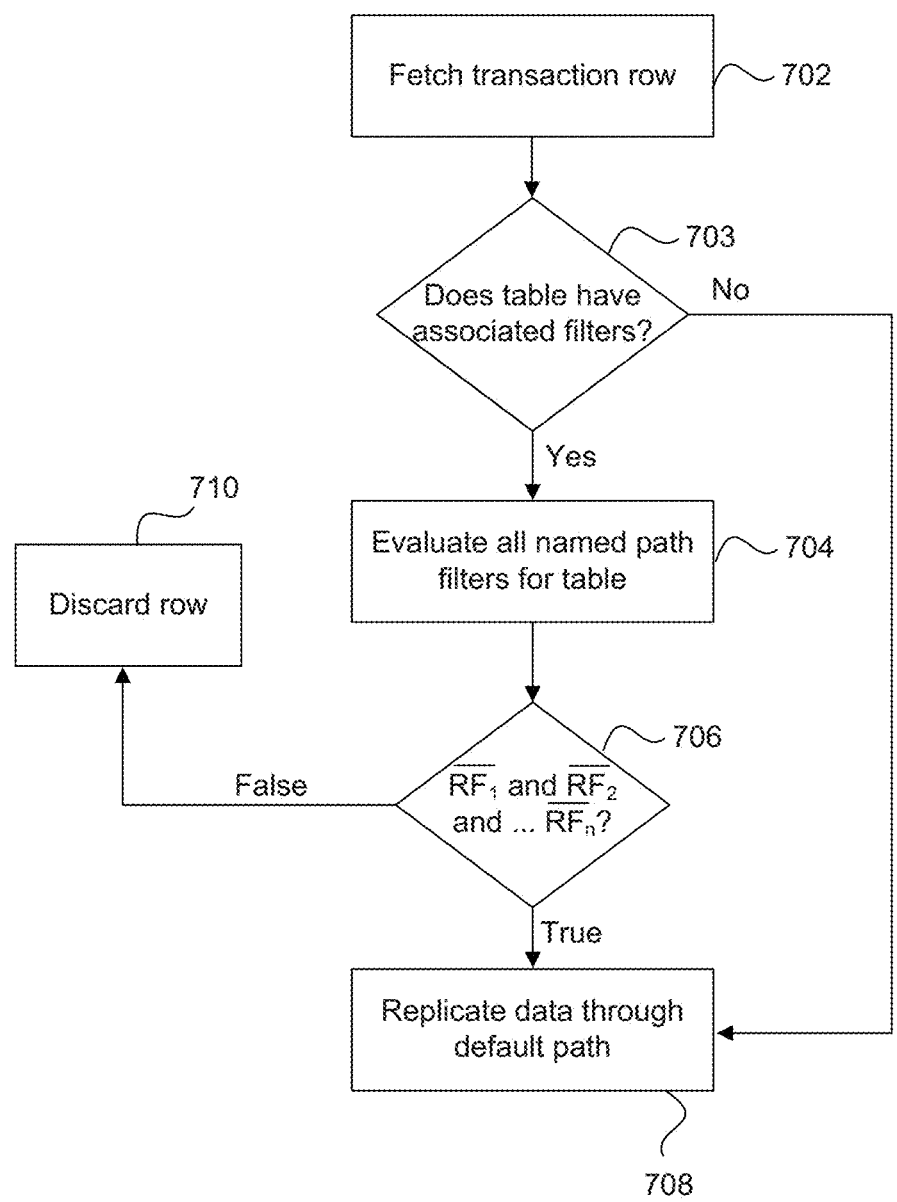
FIG. 7 is a flowchart 700 describing a method for a default path scanner to evaluate and replicate data through a default path, according to an embodiment.

FIG. 7 is a flowchart 700 describing a method for a default path scanner to evaluate and replicate data through a default path, according to an embodiment. As those skilled in the relevant arts will recognize, it is not necessary that all the described operations be performed, or be performed in the order described.

At operation 702, the default path scanner fetches a row from the transaction log.

At operation 703, the default path scanner determines whether there are any filters associated with the table. If there are no filters for the table, the default path scanner replicates the row through the default path at operations 708. If there are filters associated with the table, the default path scanner moves to operation 704.

At operation 704, the default path scanner evaluates the replication filter conditions associated with the table to determine if the transaction should be replicated through the default path. In an embodiment, the default scanner replicates data through the default path when no other paths replicate the data. In such an embodiment, when none of the replication conditions are met the transaction is replicated through the default path, for example, by describing the operation as an AND function of the negated replication conditions associated with this table for all named paths, as shown in operation 706.

If at operation 706 none of the replication filter conditions are satisfied, the default path scanner replicates the data through the default path, as shown at operation 708. Otherwise, the default path scanner discards the row, as shown at operation 710.

In an embodiment, the scanners evaluate insert, delete and/or update transactions in the transaction log. When a row is an insertion or a deletion, the scanners can handle the replication as explained thus far. However, in the case of an update row, the scanner accounts for different values of the row before and after the update operation. For example, a row may satisfy a replication filter before the update operation but may not satisfy the replication filter after the update, or vice versa. In an embodiment, a scanner handles update transactions as two basic cases:

1. Both the before-update and after-update values for the transaction row belong to the same path if the results of the evaluations the same for both (i.e., both true or both false).

2. The before-update and after-update values belong to different paths if the results of the evaluations are different for the before and after column values (i.e., one true and one false).

Figure 8A:
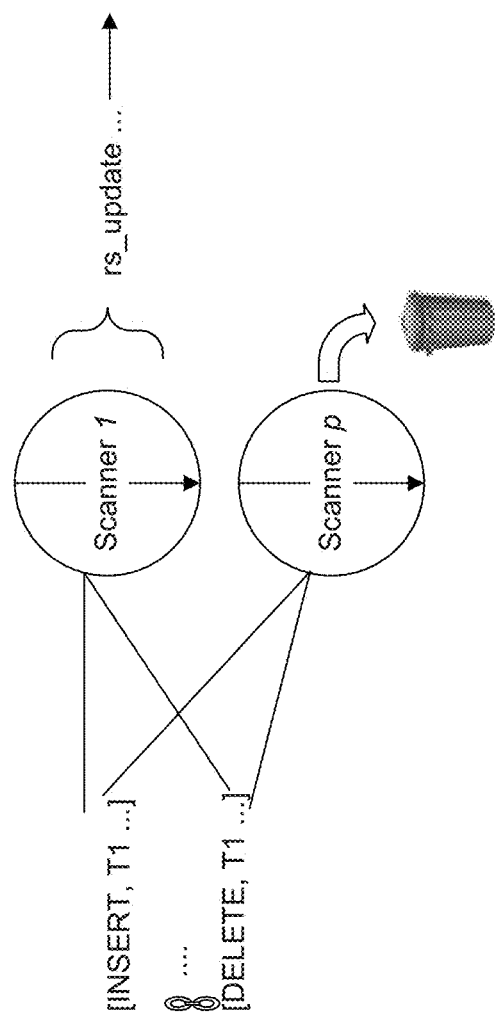
FIG. 8A is a diagram describing replication of an update operation when before and after updates values are the same, according to an embodiment.

FIG. 8A depicts a diagram describing replication of an update operation when before and after updates values are the same, according to an embodiment. Analogously, FIG. 8B depicts a diagram describing replication of an update operation when before and after updates values are different, according to an embodiment.

In an embodiment, the database logs update statements in the transaction log as distinct insert and delete records. For example, a delete statement in the transaction log may delete the data to be updated and an insert statement in the transaction log may insert a new updated value. In an embodiment, the replication agent replicates these statements as a single update statement, for example, in order to minimize network traffic. In one embodiment, when the replication filter evaluation yields case 1 described above, i.e., before and after update values evaluate to the same path, the replication agent scanners transmit a single update statement through the appropriate path, as depicted in FIG. 8A.

Figure 8B:
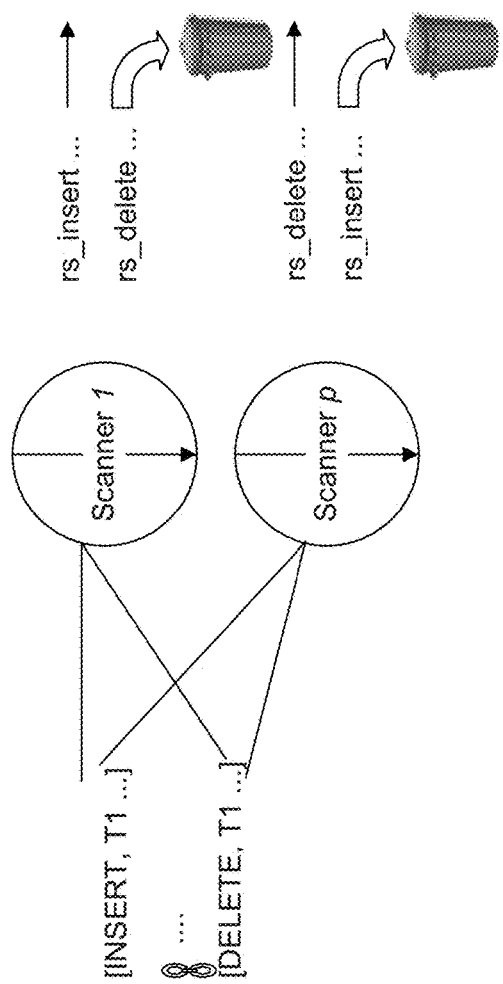
FIG. 8B is a diagram describing replication of an update operation when before and after updates values are different, according to an embodiment.

On the other hand, in one embodiment, when an update results in a replication filter evaluation as in case 2 above, where the before and after values belong to different paths, the replication agent sends these statements separately, as depicted in FIG. 8B.

Example Computer System

Figure 9:
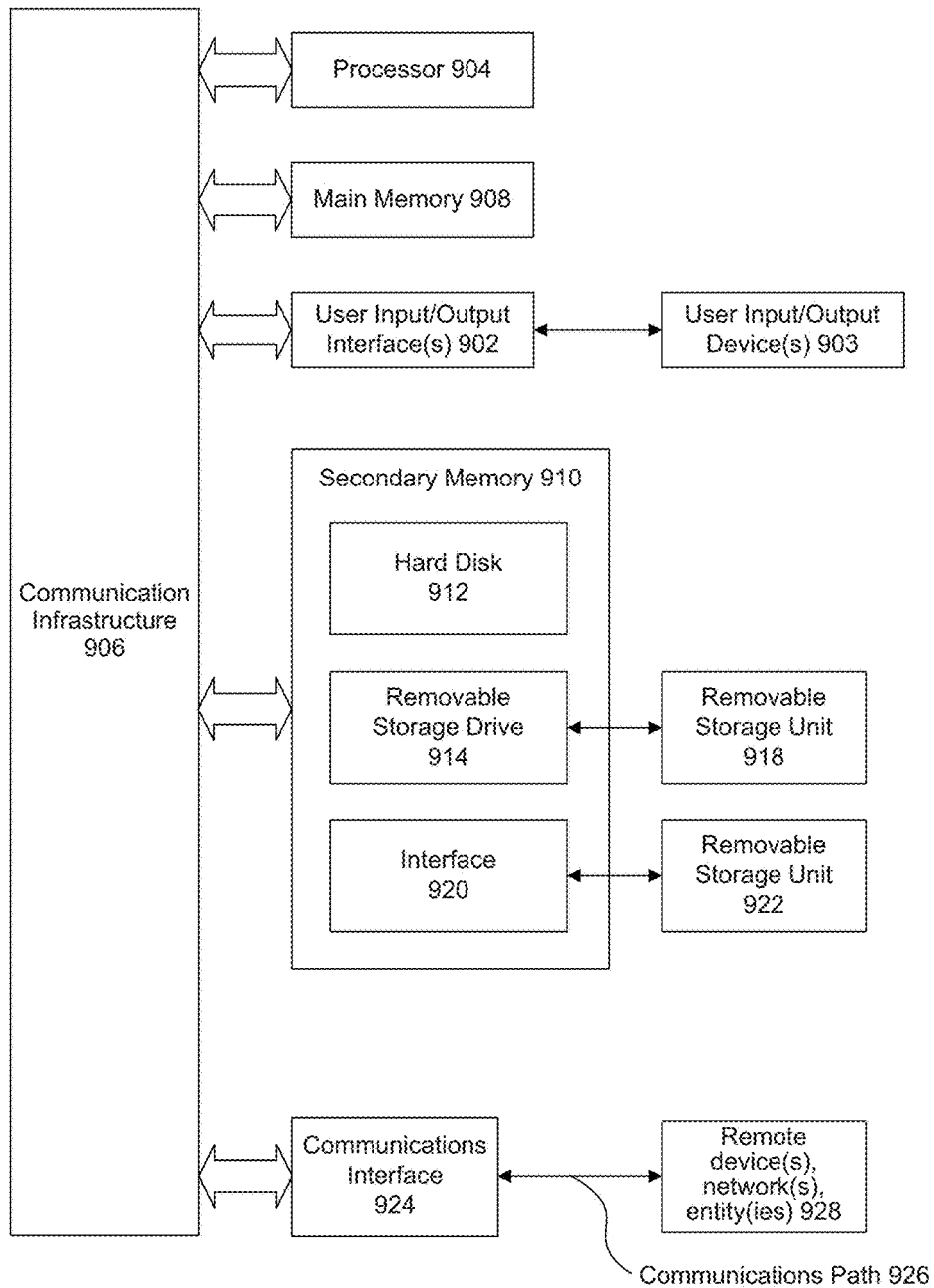
FIG. 9 is an example computer system useful for implementing various embodiments.

Various embodiments can be implemented, for example, using one or more well-known computer systems, such as computer system 900 shown in FIG. 9. Computer system 900 can be any well-known computer capable of performing the functions described herein, such as computers available from International Business Machines, Apple, Sun, HP, Dell, Sony, Toshiba, etc.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 900 also includes user input/output device(s) 903, such as monitors, keyboards, pointing devices, etc., which communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use the disclosed embodiments using data processing devices, computer systems and/or computer architectures other than that shown in FIG. 9. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A method for replicating data, comprising:
    retrieving, by at least one processor, a row from a database transaction log, wherein the row comprises row data associated with a database table of a database for replication;
    determining, by the at least one processor, which one of a plurality of physical communication paths between the database table and a replication server is to be used to route data rows for replication based on a filtering condition, wherein each of the plurality of physical communication paths corresponds to one of a plurality of replication paths;
    determining that the filtering condition includes a user-defined condition, wherein the user-defined condition is stored as a database object in the database, and wherein the user-defined condition comprises a condition specified by a user of the database that indicates to which replication path to transmit an individual record of the database transaction log;
    determining which replication path of the plurality of replication paths over which to transmit the content of the row to be replicated based on whether the content of the row satisfies the filtering condition, wherein the filtering condition corresponds to a named replication path for the replication of the row;
    selecting, by the at least one processor, the named replication path bound to the filtering condition upon the filtering condition, including the user-defined condition, being satisfied, or a default replication path if the filtering condition is not satisfied; and
    transmitting, by the at least one processor, the replicate database through the selected replication path.

2. The method of claim 1, further comprising:
    receiving the filtering condition; and
    storing the filtering condition as a database object.

3. The method of claim 1, wherein the filtering condition further specifies a database table associated with the filtering condition and a criterion for filtering a row of the table.

4. The method of claim 3, further comprising:
    associating a particular path of a plurality of replication paths with the filtering condition, wherein the transmitting comprises transmitting the row through the particular path when the filtering condition is met.

5. The method of claim 1, wherein the evaluating comprises:
    evaluating whether the content of the row satisfies one of a plurality of filtering conditions;
    determining that the row data does not satisfy at least one of the filtering conditions for the row; and
    transmitting the row through the default path based on the determining, wherein at least one other row from the database transaction log satisfies one of the filtering conditions and is transmit through the replication path corresponding to the filtering condition that was satisfied.

6. The method of claim 1, wherein the evaluating is performed using a stored procedure linked to the filtering condition including the user-defined condition, wherein the stored procedure is executed by a query processor.

7. The method of claim 1, further comprising:
    determining that the row is an update statement; and
    evaluating the update statement as an insert statement and a delete statement, wherein the transmitting further comprises transmitting the update statement when the insert and delete statements satisfy the filtering condition, and separately transmitting the insert and delete statements when the insert and delete statements do not satisfy the filtering condition.

8. A system comprising:
    a memory; and
    at least one processor coupled to the memory and configured to:
    retrieve a row from a transaction log of the database, wherein the row is associated with a database table of a database for replication;
    determine which one of a plurality of physical communication paths between the database table and a replication server is to be used to route data rows for replication based on a filtering condition, wherein each of the plurality of physical communication paths corresponds to one of a plurality of replication paths;
    determine that the filtering condition includes a user-defined condition, wherein the user-defined condition is stored as a database object in the database, and wherein the user-defined condition comprises a condition specified by a user of the database that indicates to which replication path to transmit an individual record of the database transaction log;
    determine which replication path of the plurality of replication paths over which to transmit the content of the row to be replicated based on whether the content of the row satisfies the filtering condition, wherein the filtering condition corresponds to a named replication path for the replication of the row;
    select the named replication path bound to the filtering condition upon the filtering condition, including the user-defined condition, being satisfied, or a default replication path if the filtering condition is not satisfied; and
    transmit the row to a replicate database through the selected replication path.

9. The system of claim 8, the at least one processor further configured to:
receive the filtering condition; and
store the filtering condition as a database object.

10. The system of claim 8, wherein the filtering condition further specifies a database table associated with the filtering condition and a criterion for filtering a row of the table.

11. The system of claim 10, further comprising a plurality of replication paths, the at least one processor further configured to:
associate a particular path of a plurality of replication paths with the filtering condition, wherein the transmitting comprises transmitting the row through the particular path when the filtering condition is met.

12. The system of claim 8, the at least one processor is configured to:
evaluate whether the content of the row satisfies one of a plurality of filtering conditions;
determine that the row data does not satisfy at least one of the filtering conditions for the row; and
transmit the table row through the default path based on the determining, wherein at least one other row from the database transaction log satisfies one of the filtering conditions and is transmit through the replication path corresponding to the filtering condition that was satisfied.

13. The system of claim 12, wherein the evaluating is performed using a stored procedure linked to the filtering condition including the user-defined condition, wherein the stored procedure is executed by a query processor.

14. The system of claim 8, the at least one processor further configured to:
determine that the transaction is an update statement; and
evaluate the update transaction as an insert statement and a delete statement, wherein the transmitting further comprises transmitting the update statement when the insert and delete statements satisfy the filtering condition, and separately transmitting the insert and delete transactions when the insert and delete statements do not satisfy the filtering condition.

15. A non-transitory computer-readable device having instructions stored thereon, execution of which, by at least one computing device, causes the at least one computing device to perform operations comprising:
retrieving; by at least one processor, a row from a database transaction log, wherein the row comprises row data associated with a database table of a database for replication;
determining, by the at least one processor, which one of a plurality of physical communication paths between the database table and a replication server is to be used to route data rows for replication based on a filtering condition, wherein each of the plurality of physical communication paths corresponds to one of a plurality of replication paths;
determining that the filtering condition includes a user-defined condition, wherein the user-defined condition is stored as a database object in the database, and wherein the user-defined condition comprises a condition specified by a user of the database that indicates to which replication path to transmit an individual record of the database transaction log:
determining which replication path of the plurality of replication paths over which to transmit the content of the row to be replicated based on whether the content of the row satisfies the filtering condition; wherein the filtering condition corresponds to a named replication path for the replication of the row;
selecting, by the at least one processor, the named replication path bound to the filtering condition upon the filtering condition, including the user-defined condition, being satisfied, or a default replication path if the filtering condition is not satisfied; and
transmitting, by the at least one processor, the row to a replicate database through the selected replication path.

16. The computer-readable device of claim 15, wherein the filtering condition further specifies a database table associated with the filtering condition and a criterion for filtering a row of the table.

17. The computer-readable device of claim 16, the operations further comprising:
associating a particular path of a plurality of replication paths with the filtering condition, wherein the transmitting comprises transmitting the row through the particular path when the filtering condition is met.

18. The computer-readable device of claim 15, wherein the evaluating comprises:
evaluating whether the content of the row satisfies one of a plurality of filtering conditions;
determining that the row data does not satisfy at least one of the filtering conditions for the row; and
transmitting the row through the default path based on the determining, wherein at least one other row from the database transaction log satisfies one of the filtering conditions and is transmit through the replication path corresponding to the filtering condition that was satisfied.

19. The computer-readable device of claim 16, wherein the evaluating is performed using a stored procedure linked to the filtering condition including the user-defined condition, wherein the stored procedure is executed by a query processor.

20. The method of claim 1, wherein the replication path comprises a physical or virtual communications path between a replication agent and one or more replication servers.

21. The method of claim 1, wherein the transaction log comprises a second row from a second table of a database comprising both the table and the second table, and wherein the second table is associated with a second filtering condition corresponding to a second named replication path.

22. The method of claim 1, wherein the default path and a plurality of distinct named replication paths comprising physical communication paths exist between the database table and the replication server, wherein each named replication path has its own unique name in the database, and wherein the default path does not have a name.

* * * * *